3,577,412
PROCESS FOR RECOVERING CEPHALOSPORIN $C_A$ ANTIBIOTICS

Billy G. Jackson, 4230 Lincoln Road 46208; and John L. Spencer, 1045 W. 77th S. Drive 46260, both of Indianapolis, Ind.; and Harvey M. Higgins, Jr., R.R. 1, Box 220–A, Danville, Ind. 46227
No Drawing. Continuation-in-part of abandoned application Ser. No. 437,553, Mar. 5, 1965. This application Apr. 29, 1969, Ser. No. 820,325
Int. Cl. C07d *99/24*
U.S. Cl. 260—243                                       2 Claims

ABSTRACT OF THE DISCLOSURE

Removing Cephalosporin $C_A$ antibiotics, e.g., cephaloridine, from concentrated, inorganic salt solutions thereof as the hydrothiocyanate salt using hydrochloric or sulfuric acid.

INTRODUCTION

This invention relates to processes for purifying and recovering cephalosporin $C_A$ antibiotic compounds from the reaction mixtures in which they are prepared. More particularly, this invention provides economical and yield improvements to a process in which the cephalosporin $C_A$ antibiotic, e.g., cephaloridine, is precipitated directly as the cephaloridine hydrothiocyanate salt from the diluted reaction mixture.

CROSS REFERENCE

This application is a continuation-in-part of our prior application Ser. No. 437,553, filed Mar. 5, 1965, now abandoned.

BACKGROUND OF THE INVENTION

The cephalosporin $C_A$ antibiotics are described and methods for their preparation disclosed in the co-pending application of Edwin H. Flynn, Ser. No. 398,028, filed Sept. 21, 1964, and in applications parent thereto. One method of preparation employed by Flynn involves commingling a 7-acylamidocephalosporanic acid in an aqueous medium with an excess of a pyridine at pH 6–7 and allowing the mixture to react at about 50–75° C. for about 4–8 hours.

An improved preparative method described and claimed in application Ser. No. 437,552 of Harvey M. Higgins, Jr., filed Mar. 5, 1965, now U.S. Pat. 3,270,012, incorporates thiocyanate ions in the reaction mixture, whereby the reaction is accelerated, the reactants and products are stabilized, and a better yield of the desired product is obtained. Illustratively, the ions are incorporated into the reaction mixture in the form of water-soluble salts, such as potassium thiocyanate, sodium thiocyanate, pyridine thiocyanate, triethylamine thiocyanate, lithium thiocyanate, strontium thiocyanate, ammonium thiocyanate, and the like. The said thiocyanate ions are desirably added in at least about an equimolar ratio to the starting cephalosporin compound, and preferably in a molar ratio of 2:1 to 10:1 or more. Larger quantities are not detrimental to the reaction or products but tend eventually to complicate the recovery process.

The above-described Higgins patented method for making cephaloridine is now used commercially in the overall process of making the cephalosporin $C_A$ antibiotic, cephaloridine. In this process, sodium cephalothin is dissolved in an aqueous solution of pyridine having a high content of alkali metal and thiocyanate ions. The resulting solution is heated to about 60° C. for about 5 hours at pH 5 to 7, preferably 6.5 to 7, to insure as complete a reaction as possible of the cephalothin content to form cephaloridine therefrom. The solution is strongly polar and has a high dielectric constant. The high sodium and potassium thiocyanate salt content stabilizes the sodium cephalothin to the heating temperature, and also functions to solubilize the cephaloridine product. Also, it was found that the high salt content of the solution, which exaggerates the polarity of the solution, favors the displacement of the acetoxy group of the cephalothin starting material by the pyridine to produce the cephaloridine betaine or inner salt.

However, these process conditions which were found especially desirable for production of better yields of cephaloridine than prior art methods also presented a problem of how to separate economically and in the best yields the cephaloridine content from the inorganic ions in the reaction mixture. The addition of the common strong mineral acids to the above reaction mixture does not precipitate salts of cephaloridine of these acids. We have found, unexpectedly, that the salt which precipitates is cephaloridine hydrothiocyanate. Hydrothiocyanic acid is not useful for this purpose because aqueous solutions thereof are unstable and not practical to use.

U.S. Pat. 3,280,118 describes a process of reacting an aqueous solution or suspension of a betaine of the cephaloridine type with an acid, particularly a strong acid, to form salts with that acid. However, that patent does not disclose how to precipitate cephaloridine as the salt with hydrothiocyanic acid. We have found that recovery of cephaloridine as the hydrothiocyanate salt gives improved isolation yields from the above described reaction mixtures.

It is an object of this invention to provide an improved method for separating cephaloridine, and similar cephalosporin $C_A$ compounds, from the reaction mixture containing them as hydrothiocyanate salts.

SUMMARY

Briefly, according to this invention, we have discovered unexpectedly that cephaloridine or related cephalosporin $C_A$ compounds can be separated in high yields at temperatures of from about 0° C. to about 40° C. from the highly concentrated aqueous inorganic thiocyanate salt solutions thereof by adding aqueous hydrochloric or sulfuric acid to a mixture containing dissolved cephaloridine and thiocyanate salts in an amount sufficient to form hydrothiocyanic acid in situ and precipitate cephaloridine hydrothiocyanate, generated in situ during the acidification. We have found that by so conducting the separation process, the step yields of recovered cephaloridine can be on the order of about 95 percent of the cephaloridine activity content of the reaction mixture, based on chromatographic separation and ultraviolet (UV) analysis of the total cephaloridine content in a diluted aliquot.

DETAILED DESCRIPTION OF THE INVENTION

The improved process of this invention may be practiced in processes for making a wide variety of cephalosporin $C_A$ type compounds from the corresponding cephalosporin C type compounds. Cephalosporin C type compounds are described in numerous prior art patents, among which are 3,218,318 and 3,225,038.

The compounds ultimately obtained by way of the present invention are the 7-acylamido-3-pyridinomethyl-3-cephem-4-carboxylic acid inner salts represented by the following formula:

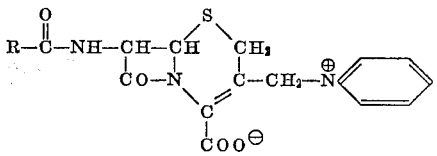

(I)
where

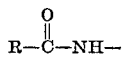

is acylamido, R being an organic radical. Also included within the scope of this invention are the hydrothiocyanic acid addition salts of the above amine bases.

The art now recognizes a wide range of acylamido groups, R—CO—NH—, at the 7 position of the cephalosporanic acid molecule and this part of the molecule is not directly concerned with the process of the present invention, which relates to the preparation of the so-called cephalosporin $C_A$ compounds, having a pyridinomethyl substituent in the 3 position rather than the acetoxymethyl substituent of the cephalosporin C compounds. Illustratively, however, the new process affords cephalosporin $C_A$ compounds wherein R has the structure:

$$R^1—(CH_2)_n—$$

where $R^1$ is hydrogen, $C_1$-$C_7$-alkyl, $C_1$-$C_7$ alkoxy, $C_1$-$C_7$ alkylmercapto, phenyl, phenoxy, phenylmercapto, thienyl, furyl, benzothienyl, or benzofuryl, and $n$ is 0 or 1.

Additionally, the art also recognizes a wide range of cephalosporin $C_A$ compounds bearing a pyridinomethyl substituent at the 3 position, the pridine ring being either unsubstituted or bearing one or more of a variety of substituents. Such substituents on the pyridine ring have no bearing upon the process of the present invention, and may thus vary widely in nature. A preferred group of compounds, from the pharmaceutical standpoint, includes unsubstituted pyridine and pyridine having, at the 3 or 4 position, a substituent selected from the group consisting of methyl, ethyl, hydroxy, hydroxymethyl, trifluoromethyl, halo, cyano, carboxy, carbo($C_1$-$C_4$)alkoxy, ($C_1$-$C_4$)alkanoyl, ($C_1$-$C_4$)alkanoyloxy, and

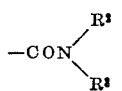

$R^2$ being hydrogen, methyl, ethyl, or cyclopropyl, and $R^3$ being hydrogen, methyl, or ethyl.

The radicals referred to above are illustrated as follows:

$C_1$-$C_7$-alkyl refers broadly to primary, secondary, and tertiary alkyl, of both straight-chain and branched-chain configuration, including methyl, ethyl, n-propyl, isopropyl, n-butyl, sec.-butyl, tert.-butyl, n-amyl, isoamyl, 2-amyl, 3-amyl, neopentyl, n-hexyl, n-heptyl, isoheptyl, 3-heptyl, 2-methylhexyl, and the like.

$C_1$-$C_7$ alkoxy refers to $C_1$-$C_7$ alkyl-O- groups wherein alkyl is as defined above.

$C_1$-$C_7$ alkylmercapto refers to $C_1$-$C_7$ alkyl-S- groups wherein alkyl is as defined above.

Thienyl, benzothienyl, furyl, and benzofuryl groups may be attached at either the α or β position.

Carbalkoxy refers to carbomethoxy, carbethoxy, carbopropoxy, carbo-n-butoxy, carbo-sec.-butoxy, carbo-tert.-butoxy, and the like.

Alkanoyl refers to acetyl, propionyl, butylryl, isobutyryl, and the like.

Alkanoyloxy refers to acetoxy, propionoxy, n-butyroxy, isobutyroxy, and the like.

The carbamyl group

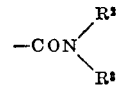

may be unsubstituted, mono-substituted, or di-substituted, as defined, and in the di-substituted embodiments, the substituents may be the same or different. Thus, illustratively, the carbamyl group may be —$CONH_2$

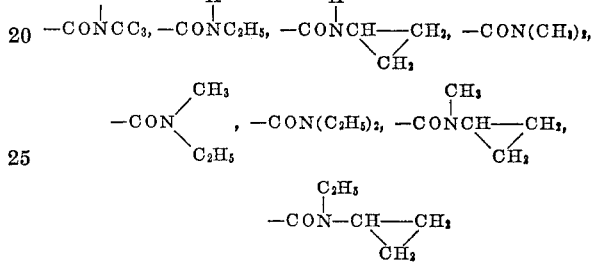

and the like.

While the compounds prepared by the novel process of the present invention have been defined in terms of a structural formula which depicts the structural features of the compounds and which indicates the presence therein of certain well-known organic radicals, including alkyl, cycloalkyl, phenyl, thienyl, benzothienyl, furyl, and benzofuryl, it will be recognized by those skilled in the art that such radicals may bear one or more substituents without departing in any way from the spirit of the invention and without altering the properties of the compounds in such a way as would prevent their preparation by the novel process herein described. Compounds having the structure represented by Formula I, supra, and bearing such substituents are accordingly to be considered as equivalents of the unsubstituted compounds and are to be considered preparable by the novel process of the invention. Among such substituents, atoms, and radicals are halo, hydroxy, nitro, lower alkyl, trifluoromethyl, methoxy, methylmercapto, cyano, hydroxymethyl, β-hydroxyethyl, acetyl, acetamido, and the like.

The compounds produced by the present invention are antibiotic substances which are highly effective against such organisms as penicillin-resistant *Staphylococcus aureus*, the hemolytic streptococci, and a variety of gramnegative pathogens such as *Shigella sonnei*, *Klebsiella pneumoniae*, *Aerobacter aerogenes*, and the like.

The invention is further illustrated by the following operating examples.

EXAMPLE 1

A solution of 200 g. of sodium 7-α-thienylacetamidocephalosporanate (sodium cephalothin), 908 g. of potassium thiocyanate, and 50 ml. of pyridine in 200 ml. of water was adjusted to pH 6.5 with 10 ml. of 85 percent syrupy phosphoric acid, and heated at 60° C. for 5 hours with stirring.

The reaction product mixture was cooled and diluted to 4 liters with distilled water. It was extracted 5 times with 200-ml. portions of chloroform and the chloroform extracts discarded. The aqueous solution was concentrated somewhat in vacuo to remove traces of chloroform. The aqueous solution was stirred and chilled to about 0° C. and acidified to pH 2 by adding 6N aqueous hydrochloric acid dropwise. The mixture was chilled for an additional 3 hours, then filtered on a sintered glass funnel, and the crystalline material washed well with water and dried in vacuo at 40° C. for about 15 hours. The product thus obtained weighed 163 g. (75 percent of theory) and was identified as 7-α-thienylacetamido - 3 - pyridinomethyl-3-cephem-4-carboxylic acid hydrothiocyanate.

*Analysis.*—Calcd. (percent): C, 50.61; H, 3.82; N, 11.81; S, 20.27; $SCN^\ominus$, 12.3. Found (percent): C, 50.87; H, 4.10; N, 11.42; S, 19.82; $SCN^\ominus$, 12.9.

The product had infrared absorption and nuclear magnetic resonance spectra consistent with the expected structure. It had an apparent molecular weight of 488 by titration in a solution of 2:1 dimethylformamide:water and a $pK'_a$ of 3.4. Its ultraviolet absorption spectrum determined in water had maxima at 236 and 255 mμ with molecular extinction coefficients of 15,900 and 14,300, respectively (E 1 percent$_{(255\ m\mu)}$ for cephaloridine=366).

Twenty-five grams of 7-α-thienylacetamido-3-pyridinomethyl-3-cephem-4-carboxylic acid hydrothiocyanate were slurried with 50 ml. of water and stirred with 150 ml. of a 25 percent solution of Amberlite LA–1 resin (basic form) in a methyl isobutyl ketone until all of the solid had gone into solution, after which stirring was continued for 15 additional minutes. The aqueous layer was separated and extracted three times with 50-ml. portions of a 25 percent solution of "Amberlite LA–1" acetate form of liquid anion exchange resin in methyl isobutyl ketone, followed by a final wash with 50 ml. of methyl isobutyl ketone. The organic wash solutions were discarded. The aqueous layer was cooled and stirred in an ice bath and seeded with 7-α-thienylacetamido - 3 - pyridino-methyl-3-cephem-4-carboxylic acid, stirring being continued for one hour at ice-bath temperature. The solid which separated was filtered off, washed successively with 10 ml. of ice water and 10 ml. of methanol, vacuum-dried, and identified by bioassay and infrared and ultraviolet spectra as 7-α-thienylacetamido - 3 - pyridino-methyl - 3 - cephem-4-carboxylic acid. The product weighed 11.5 g., representing a 52 percent conversion.

To the combined aqueous filtrate and methanol washings were added 2.5 g. of potassium thiocyanate with stirring, and the mixture was cooled in an ice bath and acidified to pH 2 by adding aqueous 10 percent hydrochloric acid. The resulting mixture was overlayered with methyl isobutyl ketone, and stirring and cooling were continued for about one hour to break up the precipitated solid material. The solid material was filtered off, washed with water, and vacuum dried. Yield 2.3 g., identified as 7-α-thienyl-acetamido - 3 - pyridinomethyl - 3 - cephem-4-carboxylic acid hydrothiocyanate salt.

EXAMPLE 2

Following the procedure suggested by Example 1 of the Eardley et al. U.S. Pat. 3,280,118, a concentrated bulk solution was prepared by dissolving 160 g. of crystalline 7-α-thienylacetamido-3-pyridinomethyl - 3 - cephem - 4-carboxylic acid (cephaloridine) in 300 ml. of deionized water, with slight warming to about 35° C. to complete the solution. The bulk solution was assayed and divided to provide five aliquots of equal volume, each containing 57.8 meq. or 24.0 g. of cephaloridine activity to approximate the concentration stated in Example 1 of the Eardley et al. patent.

That one aliquot was used in each experiment. Each aliquot was stirred (60–65 r.p.m.) at room temperature (21–22° C.) and the necessary quantities of reagents were added. Where a product separated out, it was filtered off, washed with 10–21 ml. of deionized water, dried at 45° C. in a vacuum oven overnight, and weighed. The wash solution in each case was combined with the respective mother liquor.

Experiment A: (Following the procedure of Example 1 of the Eardley et al. U.S. Pat. 3,280,118.) To one aliquot containing 57.8 meq. (24.0 g.) of cephaloridine was added 58 meq. (58 ml.) of 1.0 N hydrochloric acid solution. The final pH of the mixture was 1.0. No precipitate was observed even after cooling the mixture to 5° C. for some time.

Experiment B: To one aliquot containing 57.8 meq. (24.0 g.) of cephaloridine was added 25 g. of potassium thiocyanate, and when the potassium thiocyanate had dissolved, 58 meq. (58 ml., one equivalent) of 1.0 N hydrochloric acid solution. During the addition of the acid a precipitate appeared at pH 4.2, and crystallization was rapid as the pH was lowered with additional acid. The final pH of the mixture, after the addition of 58 ml., one equivalent of 1.0 N hydrochloric acid, was 3.75. The product was recovered as outlined supra. It was slightly off-white in color and weighed 33.9 g.

Experiment B–1: To the combined mother liquor and washings from Experiment B were added 5.2 meq. (5.2 ml.) of 1.0 N hydrochloric acid to a final pH of 1.9. Crystallization occurred rapidly. The product was isolated as before and weighed 1.9 gm.

Experiment C: To one aliquot containing 57.8 meq. (24.0 g.) of cephaloridine was added 25 g. of potassium iodide, and when the potassium iodide had dissolved, 58 meq. (58 ml., one equivalent) of 1.0 N hydrochloric acid solution. During the addition of the acid a precipitate began to appear at pH 3.8, and off-white crystals appeared as the remainder of the acid was added. The final pH was 3.70. The product recovered, as outlined supra, weighed 34.1 g.

Experiment C–1: To the combined mother liquor and washings from Experiment C were added 6.4 meq. (6.4 ml.) of 1.0 N hydrochloric acid to a pH of 1.9. The product which crystallized was isolated as before and weighed 2.5 g.

Experiment D: To one aliquot containing 57.8 meq. (24.0 g.) of cephaloridine was added 58 meq. (58 ml.) of 1.0 N hydriodic acid solution. During the addition of the acid a non-crystalline material appeared at pH 3.5 that changed into crystalline form at pH 3. The final pH was 2.60. The crystals were slightly colored and seemed less dense than those obtained in Experiment C preceding. The product recovered, as outlined supra, weighed 26.3 g.

Experiment D–1: To the combined mother liquors and washings from Experiment D were added 8.0 meq. (8.0 ml.) of 1.0 N hydriodic acid to a final pH of 2.0. Crystallization occurred and product weighing 3.9 g. was obtained by the same procedure as above.

Experiment E: To one aliquot containing 57.8 meq. (24.0 g.) of cephaloridine was added 25 g. of potassium iodide, and when the potassium iodide had dissolved 58 meq. (58 ml.) of 1.0 N hydriodic acid. During the acidification, a non-crystalline precipitate appeared at about pH 4.0, and as acidification continued, rapid crystallization occurred. The final pH was 3.70. The product recovered, as outlined supra, weighed 32.0 g.

Experiment E–1: To the combined wash and mother liquors of Experiment E were added, 11.85 meq. (11.85 ml.) of 1.0 N hydriodic acid to a final pH of 1.0. Good crystallization occurred and product weighing 4.8 g. was obtained by the same procedure as before.

The results of these experiments are summarized in the following table wherein Column 1 lists the identification of the experiment, Column 2, the initial concentration of cephaloridine in mg./ml.; Column 3, the initial activity of cephaloridine in milliequivalents (meq.); Column 4, amount of added potassium thiocyanate; Column 5, amount of added potassium iodide; Column 6, amount of aqueous hydrochloric acid added, in terms of meq.; Column 7, amount of aqueous hydriodic acid added, in terms of meq.; Column 8, the final pH of the solution; Column 9, the weight of dried product obtained; Column 10, the purity of the product, as measured by UV; and Column 11, percent yield of cephaloridine salt (on cephaloridine activity basis) obtained by adding one equivalent of acid.

TABLE I

Crystallization of cephaloridine salts from concentrated solution

| | Initial conc., mg./ml. | Initial act., meq. | Added KSCN, gm. | Added KI, gm. | Added HCl, meq. | Added HI, meq. | Final pH | Wt. of product, gm. | UV purity, percent | Cephaloridine yield activity, percent yield [1] |
|---|---|---|---|---|---|---|---|---|---|---|
| Experiment: | | | | | | | | | | |
| A | 342 | 57.8 | | | 58 | | 1.0 | 0 | | |
| B | 342 | 57.8 | 25 | | 58 | | 3.75 | 33.9 | 72.3 | 95.1 |
| C | 342 | 57.8 | | 25 | 58 | | 3.70 | 34.1 | 60.8 | 92.3 |
| D | 342 | 57.8 | | | | 58 | 2.60 | 26.3 | 63.8 | 86.2 |
| E | 342 | 57.8 | | 25 | | 58 | 3.70 | 32.0 | 63.8 | 85.8 |
| Crystallization from above mother liquors | | | | | | | | | | |
| B-1 | | | | | 5.2 | | 1.9 | 1.6 | 79.3 | |
| C-1 | | | | | 6.4 | | 1.9 | 2.5 | 70.3 | |
| D-1 | | | | | | 8.0 | 2.0 | 3.9 | 69.5 | |
| E-1 | | | | | | 11.85 | 1.9 | 4.8 | 70.4 | |

[1] Based on UV absorption at 255 mμ. $E^{1\ percent}_{(255\ m\mu)}$ for cephaloridine=366.

The above data clearly show that the addition of hydrochloric acid to a solution of cephaloridine and thiocyanate ions permits a greater recovery of cephaloridine from the reaction mixture than any procedure suggested by U.S. Pat. 3,280,118.

Following recovery of the cephalosporin $C_A$ addition salt as the insoluble hydrothiocyanate, the inner salt or betaine is conveniently regenerated by contact with a suitable base in the presence of solvents such as acetonitrile, dimethylacetamide, dimethylformamide, acetone, methanol, ethyl acetate, chloroform, benzene, water or the like, or mixtures thereof. Bases suitable for use in the above recovery method include anion exchange resins in base form, organic bases such as triethylamine, pyridine, dimethylaniline, or the like, or inorganic bases such as sodium hydroxide, potassium hydroxide, and the like.

In a preferred post-precipitation treatment, the cephalosporin $C_A$ addition salt is wetted with a minimum quantity of water and contacted with a water-insoluble secondary amine anion-exchange resin (in the base form) in a water-immiscible organic solvent (e.g., Amberlite LA–1 in methyl isobutyl ketone). Such resins have been found to have a high capacity for taking up thiocyanate ions, thereby removing most of the interfering anions from the cephalosporin $C_A$ material. As a final treatment, the anion exchanger can be employed again in the acetate cycle, exchanging any remaining traces of thiocyanate for acetate, and leaving the cephalosporin $C_A$ values free of any materials which would tend to interfere with crystallization.

Illustratively, suitable organic amine anion-exchange resins include those marketed by Rohm and Haas under the trade name "Amberlite LA–1" and described in U.S. Pat. 2,870,207. Amberlite LA–1 is a member of a family of high molecular weight liquid secondary amine anion-exchange resins, water insoluble, but readily soluble in hydrocarbons and other non-aqueous solvents. LA–1 has a structural configuration consisting of two highly branched aliphatic chains attached to the nitrogen atom, a structure responsible for its excellent solubility in organic solvents and extremely low solubility in aqueous solutions. These solubility characteristics, together with the ability of secondary amines to react with acids to form the corresponding amine salts, make the resin effective for the removal of acidic constituents from an aqueous solution.

A representative secondary amine anion-exchange resin is described by its preparation in Example 3 of the said patent. According to that example, there are brought together in a reaction vessel 286.5 parts of a trialkylcarbinylbutenyl chloride containing 18 carbon atoms and 702 parts of tricosylcarbinylamine. The mixture is heated for 3 hours at 170–175° C. and then 40 parts of sodium hydroxide dissolved in 175 parts of water are added. The mixture is stirred for 30 minutes at 75° C. and is then allowed to cool and separate into layers. The product is obtained as the residue from the upper organic layer after the layer has been stripped under reduced pressure. The product is a secondary amine referred to as N-octadecenyl-N-tetracosylamine.

In the preferred post-precipitation procedure, the cephalosporin $C_A$ hydrothiocyanate addition salt is slurried with a minimum quantity of water and contacted with a solution of "Amberlite LA–1" liquid anion exchange resin in methyl isobutyl ketone, the methyl isobutyl ketone being a non-solvent for the cephalosporin $C_A$ product. The anion exchange resin thus serves to remove the hydrothiocyanic acid from the cephalosporin $C_A$ addition salt, the cephalosporin $C_A$ remaining in the aqueous layer of the mixture, which aqueous layer is conveniently separated and washed successively with a 25 percent solution of "Amberlite LA–1" liquid anion exchange resin (in acetate form) in methyl isobutyl ketone to remove final traces of thiocyanate ion, then with an organic solvent such as methyl isobutyl ketone, ethyl acetate, or the like, to remove traces of the anion exchange resin acetate. The aqueous layer is chilled, whereby the 7-acylamido-3-pyridinomethyl-3-cephem - 4 - carboxylic acid is obtained as a crystalline product, which is filtered off. To the filtrate therefrom is added a water soluble thiocyanate salt, and the mixture is re-acidified, thereby precipitating an additional quantity of the cephalosporin $C_A$ addition salt, which is filtered off and treated with the anion exchange resin as previously described to yield the 7-acylamido - 3 - pyridinomethyl-3-cephem-4-carboxylic acid. By thus reworking the filtrate, the yield of valuable cephalosporin $C_A$ material is appreciably increased.

In one embodiment of the Higgins process, referred to above, a mixture of potassium thiocyanate, pyridine, and 7-α-thienylacetamidocephalosporanic acid sodium salt (sodium cephalothin) is allowed to react in an aqueous medium at around pH 3–8.5, preferably pH 6–7, at an elevated temperature of about 40 to about 100° C., preferably from around 50 to around 75° C., the pH being conveniently adjusted with 85 percent phosphoric acid. Under the preferred conditions, a reaction time of about 4–8 hours is sufficient. Lower temperatures require longer times, while higher temperatures can cause product degradation. The cephalosporin starting material should be used in the form of its salt, for example, the sodium, potassium, or ammonium salt. The pyridine should be used in at least equimolar ratio to the cephalosporin compound, and preferably in an excess of 10–100 percent or more (e.g., around 30 percent excess) in order to further aid in the maximum conversion of the more expensive cephalosporin C compound. Under the conditions of the reaction, the acetoxy group of the cephalosporin molecule is split off and replaced by pyridine, the attachment of the latter moiety to the residual methylene group being directly to the nitrogen atom, forming a quaternary ammonium derivative, which in turn forms an inner salt with the carboxyl in the 4 position.

The reaction product mixture is conveniently worked up by diluting it with several volumes of water and washing the aqueous reaction product mixture with an inert organic solvent such as chloroform to remove unreacted pyridine. Traces of chloroform are conveniently removed from the washed aqueous reaction product mixture by concentrating under reduced pressure. In accordance with the present invention, the aqueous mixture is stirred and chilled to about 0° C. and acidified with dilute aqueous hydrochloric or sulfuric acid, causing 7-α-thienylacetamido-3-pyridinomethyl-3-cephem-4-carboxylic acid hydrogen thiocyanate to precipitate, thus separating the cephalosporin $C_A$ product, in the form of its hydrothiocyanate salt, from unreacted starting materials, excess thiocyanate, undersired by-products and impurities.

The identity of the hydrogen thiocyanate salt is established by its physical and chemical properties, as illustrated in Example 1, as well as by elemental analysis.

We claim:
1. In a method for preparing a 7-acylamido-3-pyridinomethyl-3-cephen-4-carboxylic acid wherein the 7-acylamido substituent is

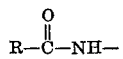

in which R is R'—CH$_2$)$_n$—, where R' is selected from the group consisting of hydrogen, $C_1$–$C_7$-alkyl, $C_1$–$C_7$-alkoxy, $C_1$–$C_7$-alkylmercapto, phenyl, phenoxy, phenylmercapto, thienyl, furyl, benzothienyl, and benzofuryl; $n$ is 0 to 1 and wherein pyridino is selected from the group consisting of unsubstituted pyridino and pyridino having, at the 3 or 4 position, a substituent selected from the group consisting of methyl, ethyl, hydroxy, hydroxymethyl, trifluoromethyl, halo, cyano, carboxy, carbo ($C_1$–$C_4$)alkoxy, ($C_1$–$C_4$)alkanoyl, ($C_1$–$C_4$)alkanoyloxy, and

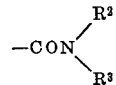

where $R^2$ is hydrogen, methyl, ethyl, or cyclopropyl, and $R^3$ is hydrogen, methyl, or ethyl, which method comprises reacting a 7-acylamidocephalosporanic acid, or a sodium or potassium salt thereof wherein the 7-acylamido is defined as above, with a pyridine, the pyridine being defined as above, in an aqueous medium in the presence of an at least equimolar proportion, based on said 7-acylamidocephalosporanic acid, of thiocyanate ion, the improvement which comprises adding aqueous hydrochloric or sulfuric acid to the reaction mixture to form hydrothiocyanic acid in situ and precipitate the 7-acylamido-3-pyridinomethyl-3-cephem-4-carboxylic acid hydrothiocyanate salt.

2. An improved method as defined in claim 1 wherein aqueous hydrochloric acid is added to a mixture containing dissolved cephaloridine and thiocyanate salts in an amount sufficient to form hydrothiocyanic acid in situ and precipitate cephaloridine hydrothiocyanate, generated in situ during the acidification.

References Cited
UNITED STATES PATENTS 3,270,012  8/1966  Higgins _____ 260—243C NICHOLAS S. RIZZO, Primary Examiner